Sept. 1, 1964  J. E. FROST  3,146,545
ANIMAL TRAP
Filed June 17, 1963  2 Sheets-Sheet 2
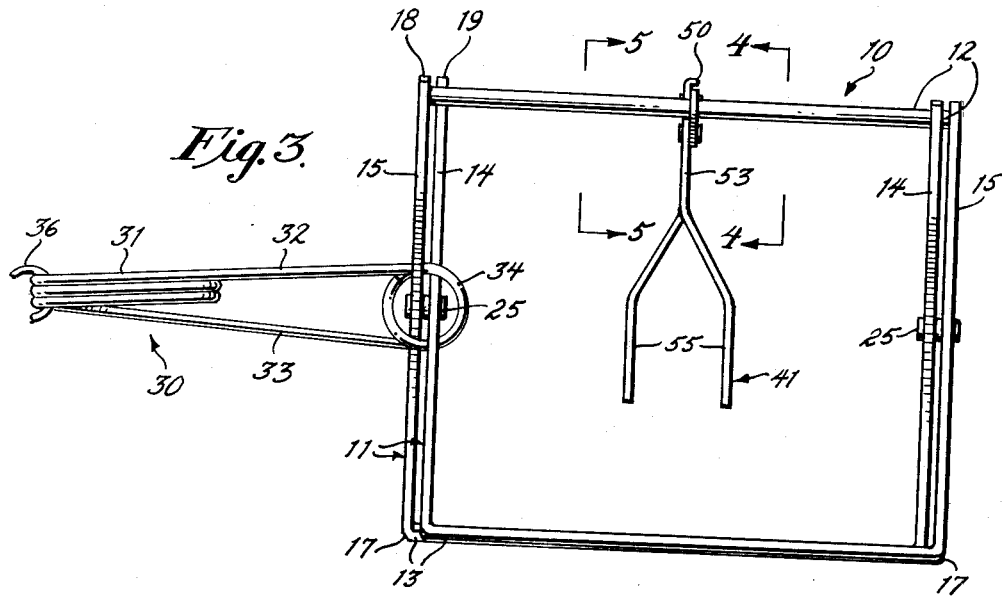
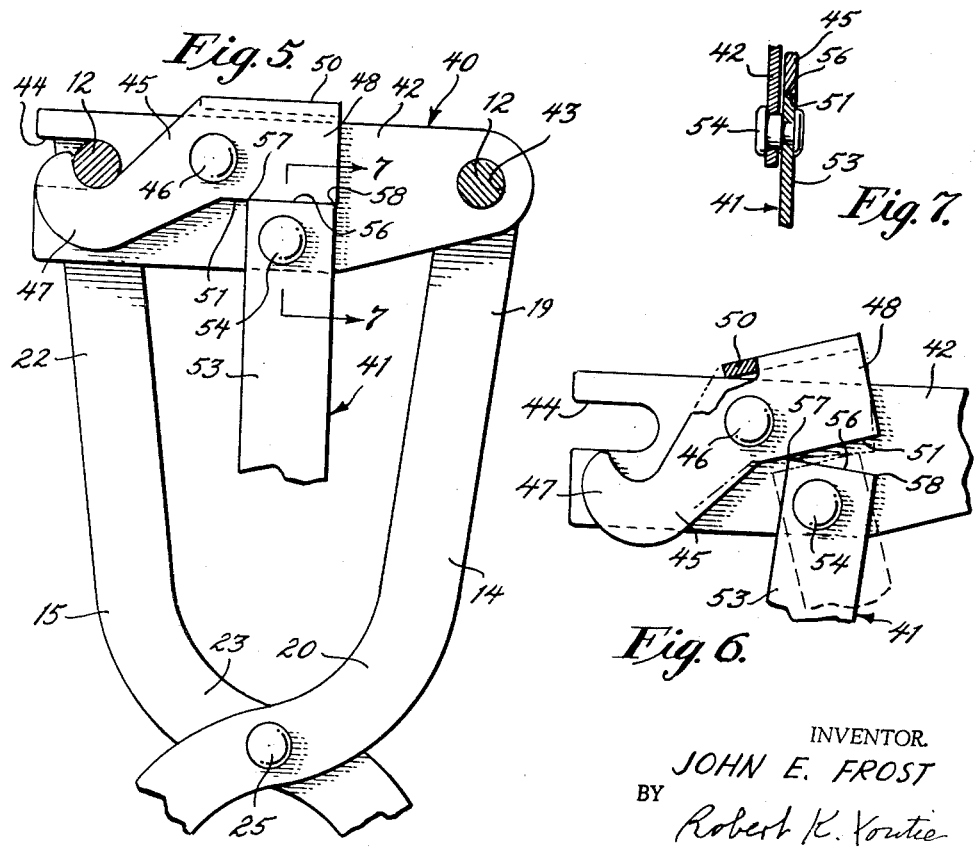
INVENTOR.
JOHN E. FROST
BY Robert K. Youtie
ATTORNEY United States Patent Office 3,146,545
Patented Sept. 1, 1964

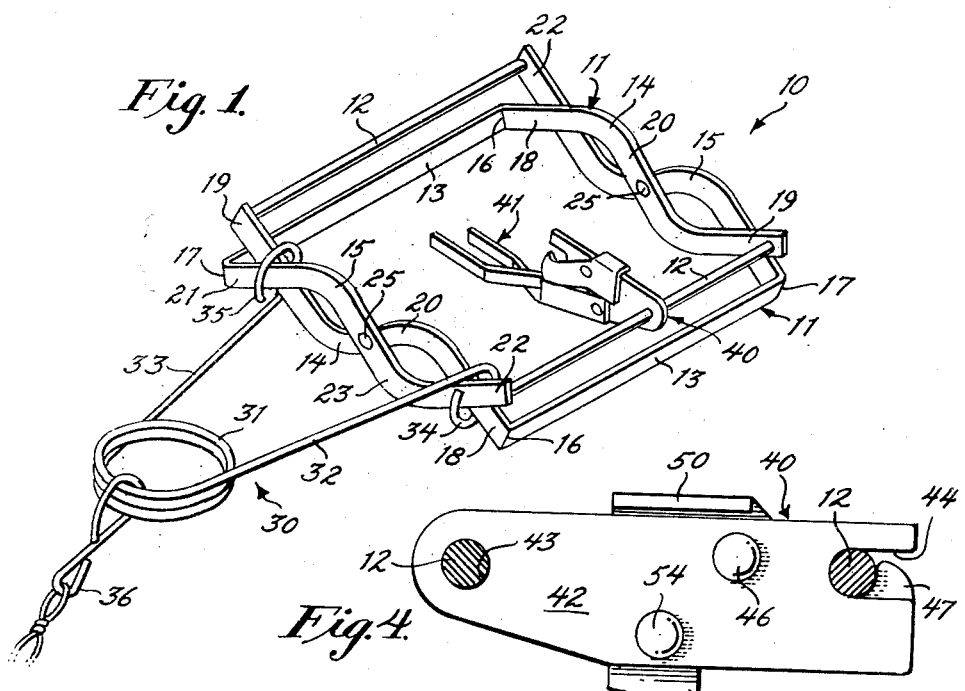
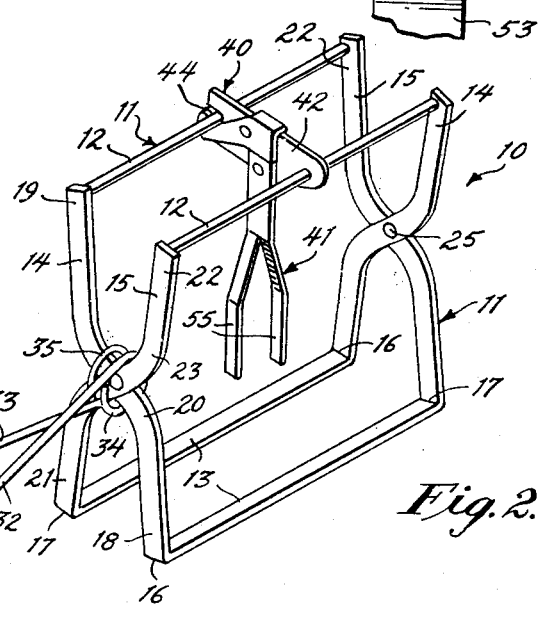

1

3,146,545
ANIMAL TRAP
John E. Frost, 10 W. Braddock Drive, Somers Point, N.J.
Filed June 17, 1963, Ser. No. 288,421
5 Claims. (Cl. 43—90)

This invention relates to a highly improved construction of animal trap.

It is one object of the present invention to provide an animal trap in accordance with the instant invention which is more quickly and easily opened or set in animal-catching condition, and which may be extremely sensitive in the set condition to release, to insure quick and positive trapping action.

It is another object of the present invention to provide an animal-trap construction of the type described which is equally highly effective in trapping animals approaching from opposite sides of the tray, and which is of a construction affording greater animal-holding strength in the closed or released position sides of the trap, and which is of a construction affording greater animal-holding strength in the closed or released position of the trap.

It is a further object of the present invention to provide an animal trap having the advantageous characteristics mentioned in the preceding paragraphs, which trap is of extremely simple construction, durable and entirely reliable throughout a long useful life, and which is capable of economic manfacture for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a top perspective view showing a trap of the present invention in its closed or released position;

FIGURE 2 is a top perspective view showing the trap of FIGURE 1 in an open or set position;

FIGURE 3 is a side elevational view of the trap as shown in FIGURE 2;

FIGURE 4 is a partial sectional elevational view taken generally along the line 4—4 of FIGURE 3, somewhat enlarged;

FIGURE 5 is a partial sectional elevational view taken generally along the line 5—5 of FIGURE 3, somewhat enlarged;

FIGURE 6 is a fragmentary view similar to FIGURE 5, partly in section and illustrating alternate release positions of the trap-holding means; and FIGURE 7 is a fragmentary sectional detail view taken generally along the line 7—7 of FIGURE 5.

Referring now more particularly to the drawings, and specifically to FIGURES 1-3 thereof, the trap of the present invention is there generally designated 10, and includes a pair of generally rectangular, open frames 11, which may be substantially identical in construction. Each of the frames 11 may include a pair of parallel, spaced, elongate sidepieces 12 and 13, and a pair of spaced endpieces 14 and 15 extending between and connected to the ends of the sidepieces.

2

In one embodiment, as illustrated, each frame 11 may have its sidepiece 13 and endpieces 14 and 15 integrally fabricated of a single metal strip, the sidepiece 13 being substantially straight and bent approximately 90 degrees at its ends or corners 16 and 17, integrally from which extend respective ends or endpieces 14 and 15. The ends 14 and 15 of each frame 11 are of a modified S or Z shape, the ends 14 having approximately parallel end portions 18 and 19 connected together by a transverse intermediate portion 20 serving to offset the end portions 18 and 19 of each frame end 14. Similarly, each frame end 15 has its end portions 21 and 22 generally parallel and offset by an intermediate transverse portion 23. Further, the reversely curved, sinuous ends 14 and 15 of each frame 11 lie in parallel planes and are parallel with each other along their curved configurations.

That is, extending from opposite ends of each sidepiece 13, the ends 14 and 15 have their inner end portions 18 and 21 parallel, as well as their intermediate portions 20 and 23 parallel, and their distal end portions 19 and 22 parallel. The sides 12 of each frame 11 may extend between the distal end portions 19 and 22 of frame ends 14 and 15, and may be of circular rod stock, as illustrated, being welded or otherwise suitably secured to the frame ends.

It will now be appreciated that the generally rectangular, open frames 11 may be substantially identical, and are arranged in a substantially aligned relation with one frame inverted relative to the other. By this construction it is apparent that the frames 11 are interchangeable in manufacture to achieve substantial economies.

In the above-described substantially aligned relation, pairs of frame ends 14 and 15 of respective frames 11 are located proximate to each other, with one frame end 14 of each frame extending through and inward of the other frame, and the frame end 15 of each frame lying outward of the other frame. In this condition, the intermediate frame end portions 20 and 23 of each pair of adjacent ends 14 and 15 extend in closely crossing relation and are connected together by suitable pivot means or pins 25. The pivots 25 at opposite pairs of frame ends are in alignment with each other generally parallel to the frame sides 12 and 13 to connect the frames together for relative swinging movement between their released or closed position of FIGURE 1 and their set or open position of FIGURE 2. It will now be appreciated that the pivots 25 extend transversely of the major cross-sectional dimension or width of the frame sides 14 and 15, for a purpose appearing presently.

Suitable resilient means 30 is connected to the frames 11 to yieldably and forcibly urge the latter toward the released or closed position of FIGURE 1. The resilient means may include a coil spring 31 having a pair of extensions or arms 32 and 33 respectively provided at their outer ends with loops 34 and 35. The loops 34 and 35 are slidably engaged about one adjacent pair of frame sides 14 and 15, on opposite sides of the pivotal connection 25 and resiliently biased away from each other to urge the frames toward their closed or released condition. In the set-up or open condition of FIGURE 2, it will be observed that the spring arms 32 and 33 have been moved toward each other, against the force of coil spring 31, being slid along the received frame ends 14 and 15 toward the pivotal connection 25. The frame is held in its open or set condition of FIGURE 2 by holding means 40 releasably connected between the frame sides 12.

Of course, suitable tether means, such as a chain 36, may be connected to the assembly, as at the spring 31 to prevent loss of the trap.

The holding means 40, mentioned above, serves to hold the frames 11 in their vertical or set condition of FIGURES 2 and 3; and, depending from the holding means 40 within the vertical frames is a trigger 41 adapted to be moved by an animal to release the holding means and permit rapid closure or swinging of the frames 11 to their horizontal, released or closed position of FIGURE 1.

As best seen in FIGURES 4 and 5, the holding means 40 includes a carrier member or plate 42 having a through hole or opening 43 at one end for rotatably receiving one frame side 12. Extending inward from the other end of the carrier member or plate 42 is an opening or notch 44 adapted to removably receive the side 12 of the other frame. In the set or open condition of FIGURES 4 and 5, the carrier member or plate 42 is disposed generally vertically and extends horizontally between the upper frame sides 12.

On one side of the carrier member 42 is mounted a catch 45. The catch 45 is pivotally connected to the carrier member 42 at a location adjacent to and spaced inward from the opening 44, as by a pivot pin 46. The pivot pin 46 is located intermediate the ends of the catch 45, one end of the catch being formed with an upwardly facing retaining hook 47 swingable across the opening 44 into closing relation therewith. The other end portion 48 of the catch 45 extends generally toward the carrier opening 43, terminating generally medially between the openings 43 and 44.

As best seen in FIGURE 5, the carrier-member opening 44 is configured to slidably conformably receive a frame side 12, and is located at a level slightly below that of pivot pin 46. Stop means may be provided for limiting swinging movement of the catch 45, as by a flange or lip 50 extending from the upper edge of the catch over the upper edge of the carrier member. In setting the trap, the flange or lip 50 is depressed to swing the hook 47 into retaining engagement with the frame side 12 received in opening 44, while opening movement or release of the catch is limited to the solid-line position shown in FIGURE 6 by abutting engagement of the flange 50 with the upper edge of the carrier member 42.

Although the center line of the frame side 12 retained in opening 44 by hook 47 in FIGURE 5 is located below the center line of pivot 46, the catch maintains its retaining engagement by friction. For more or less sensitivity of release, the center line of the engaged frame side 12 may be lower or higher relative to the center line of pin 46.

The catch end portion 48 may include a generally horizontal, straight lower edge 51. Depending from the carrier member 42 directly below the catch portion 48 is the trigger 41. The trigger may include an upper strip or stem 53 having its upper portion pivotally connected, as by a pivot 54 to the carrier member 42 directly below the catch end portion 48. Depending from the lower end of the trigger stem 53 may be bifurcations 55. In practice, the trigger 41 may be integrally fabricated of strip material, the bifurcations 55 being defined by a longitudinal slit and transverse bends to extend out of the plane of the stem portion 53. In FIGURE 5 it will be observed that the stem 53 has its upper end edge generally flat, as at 56 and extending laterally to meet the side edges at corners 57 and 58. It will also be observed that the pivot pin 54 is located more closely to the corner 57 than to the corner 58. Further, the pivot pin 46 is located more closely to the corner 57 than to the corner 58. Thus, upon swinging movement of the trigger 41 about its pivot 54, the corner 57 moves in an arc of shorter radius than the corner 58. By this construction, substantially equal swinging movement of the trigger 41 in either direction about its pivot 54 may achieve release of the retained side 12 from the catch 45. For example, upon counterclockwise rotation of the trigger 41 the lever point or corner 58 engages the lower edge 51 of catch 45 to swing the latter counterclockwise out of its closing relation with the opening 44. Upon clockwise rotation of the trigger 41 about pivot 54 the lever point or contact 57 engages with the lower catch edge 51 to effect opening or releasing movement of the latter. The relatively large radius arc swung by lever contact 58 to achieve opening movement of the catch 45 requires substantially the same trigger movement as the relatively small radius arc swung by lever contact point 57 to open the catch, by reason of the relative distances from the pivot 46. Hence, the trigger 41 is equally effective upon actuation by an animal moving in either direction.

To insure free pivotal action of the catch 45 and trigger 41, the pivots 46 and 54 may advantageously be of a nonbinding construction, such as shoulder rivets shown in FIGURE 7.

While operation of the instant trap construction is believed obvious from the foregoing, a brief description follows. From the collapsed or closed condition of FIGURE 1, it is only necessary to manually squeeze the spring arms 32 and 33 to permit relative pivotal movement of the frames 11 and swing the frame sides 12 upward toward each other. In this condition one frame side 12 is engaged into the carrier opening 44 and the catch flange 50 depressed to effect retaining engagement by the hook 47. The flange 50 is released and the trap is in its open or set condition of FIGURES 2–5. In this condition, it may be noted that the trigger 41 depends generally centrally within the trap for optimum balance and accessibility by an animal.

Of course, swinging movement of the trigger 41 about its pivot 54 effects pivotal movement of the catch 45 to release the retained frame side 12, as described hereinbefore. This permits quick and forceful return of the frames 11 to their closed condition of FIGURE 1 to effectively hold an animal between adjacent sides 12 and 13. By the direction of maximum cross-sectional dimension or width of the frame ends 14 and 15, greater spring strength and animal-holding power may be achieved.

From the foregoing, it is seen that the present invention provides an animal trap which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A trap comprising a pair of open substantially aligned frames each having a pair of parallel sides and a pair of spaced ends extending between said sides, pivot means respectively connecting said ends together for relative swinging movement of said frames between a set position with one side of each frame adjacent to one side of the other frame and a released position with said one side of each frame adjacent to the other side of the other frame, resilient means connected to said frames and urging the latter to their released position, a carrier member having one end connected to said one side of one frame and extending toward said one side of the other frame in the set position, said carrier member having an opening at its other end removably receiving said one side of the other frame in the set position, a catch pivotally carried by said carrier member for swinging movement into and out of retaining engagement with said one side of the other frame received in said opening, and a trigger swingably carried by and depending from said carrier member and engageable upon swinging movement with said catch to move the latter out of said retaining engagement and release said frames.

2. A trap according to claim 1, said trigger being pivotally connected to said carrier member to depend generally medially between said one frame sides in the set position.

3. A trap according to claim 1, said trigger including a pair of lever projections respectively engageable with said catch upon pivotal trigger movement in opposite directions to swing the catch out of its retaining engagement.

4. A trap according to claim 1, said catch being pivoted intermediate its ends to said carrier member, and an upwardly facing hook at one end of said catch for said retaining engagement, said trigger being engageable with the other end of said catch to move the latter out of said retaining engagement.

5. A trap according to claim 4, in combination with a stop on said catch engageable with said carrier member to limit catch movement out of said retaining engagement.

References Cited in the file of this patent
UNITED STATES PATENTS

| | | |
|---|---|---|
| 2,701,428 | Mau | Feb. 8, 1955 |
| 3,010,245 | Conibear | Nov. 28, 1961 |
| 3,106,036 | Lehn | Oct. 8, 1963 |